US010719768B1

United States Patent
Segev et al.

(10) Patent No.: US 10,719,768 B1
(45) Date of Patent: Jul. 21, 2020

(54) SYSTEM AND METHOD FOR DETECTING AN UNDESIRABLE EVENT

(71) Applicant: ThetaRay Ltd, Hod HaSharon (IL)

(72) Inventors: David Segev, Lapid (IL); Amir Averbuch, Tel-Aviv (IL)

(73) Assignee: ThetaRay Ltd., Hod HaSharon (IL)

( * ) Notice: Subject to any disclaimer, the term of this patent is extended or adjusted under 35 U.S.C. 154(b) by 0 days.

(21) Appl. No.: 16/371,311

(22) Filed: Apr. 1, 2019

Related U.S. Application Data

(63) Continuation of application No. 14/960,371, filed on Dec. 5, 2015, now Pat. No. 10,296,832.

(51) Int. Cl.
*G06N 5/04* (2006.01)
*G06N 5/02* (2006.01)
*G06F 16/28* (2019.01)

(52) U.S. Cl.
CPC ............ *G06N 5/02* (2013.01); *G06F 16/283* (2019.01); *G06N 5/04* (2013.01)

(58) Field of Classification Search
None
See application file for complete search history.

(56) References Cited

U.S. PATENT DOCUMENTS 10,296,832 B1 * 5/2019 Segev ............... G06F 21/554

OTHER PUBLICATIONS

Radovanovic, et al., Hubs in Space: Popular Nearest Neighbors in High-Dimensional Data, Journal of Machine Learning Research 11 (2010) pp. 2487-2531 (Year: 2010).*

Dempster et al; "Maximum Likelihood from Incomplete Data via the EM Algorithm", Journal of the Royal Statistical Society 39(1) pp. 1-38. 1977.

Mahoney et al; "An analysis of the 19995 DARPA/Lincoln Laboratory evaluation data for network anomaly detection", Proceeding of Recent Advances in Intrusion Detection (RAID) vol. 2820, pp. 220-237.2003.

* cited by examiner

*Primary Examiner* — Wilbert L Starks

(74) *Attorney, Agent, or Firm* — Nathan & Associates; Menachem Nathan

(57) ABSTRACT

A system for detecting an unknown undesirable event comprises an input device configured to receive a dataset comprising a plurality n of multidimensional datapoints (MDDPs), a processor configured to embed the MDDPs in an lower dimension embedded space to obtain embedded MDDPs, and a detection engine configured to calculate distributions of distances $D_{nn}^i$, i=1, ..., n of each embedded MDDP from a plurality of nearest-neighbors (nn) to compute a threshold $D_{nn}^t$ and to classify a particular MDDP of the dataset or a newly arrived MDDP (NAMDDP) as an abnormal MDDP based on comparison with threshold $D_{nn}^t$, wherein the classification is automatic and unsupervised without relying on a signature, rules or domain expertise and wherein the particular MDDP classified as abnormal is indicative of the unknown undesirable event.

19 Claims, 5 Drawing Sheets

SYSTEM AND METHOD FOR DETECTING AN UNDESIRABLE EVENT

CROSS REFERENCE TO RELATED APPLICATIONS

This application is a continuation application of U.S. patent application Ser. No. 14/960,371 filed Dec. 5, 2015 (now allowed).

TECHNICAL FIELD

Embodiments disclosed herein relate in general to methods and systems for detecting unknown undesirable events from analysis of data including multidimensional data points (MDDPs).

BACKGROUND

Huge amounts of data are generated by many sources. "Data" refers to a collection of organized information, the result of experience, observation, measurement, streaming, computed, sensed or experiment, other information within a computer system, or a set of premises that may consist of numbers, characters, images, or as measurements of observations.

Static and dynamic "high dimensional big" data (HDBD) is common in a variety of fields. Exemplarily, such fields include finance, energy, transportation, communication networking (i.e. protocols such as TCP/IP, UDP, HTTP, HTTPS, ICMP, SMTP, DNS, FTPS, SCADA, wireless and Wi-Fi) and streaming, process control and predictive analytics, social networking, imaging, e-mails, governmental databases, industrial data, healthcare and aviation. HDBD is a collection of MDDPs. A MDDP, also referred to as "sample", "sampled data", "point", "vector of observations" or "vector of measurements", is one unit of data from the original (source, raw) HDBD. A MDDP may be expressed by Boolean, integer, floating, binary or real characters. HBDB datasets (or databases) include MDDPs that may be either static or may accumulate constantly (dynamic) MDDPs may include (or may be described by) hundreds or thousands of parameters (or "features").

The terms "parameter" or "feature" refer to an individual measurable property of phenomena being observed. A feature may also be "computed", i.e. be an aggregation of different features to derive an average, a standard deviation, etc. "Feature" is also normally used to denote a piece of information relevant for solving a computational task related to a certain application. More specifically, "features" may refer to specific structures ranging from simple structures to more complex structures such as objects. The feature concept is very general and the choice of features in a particular application may be highly dependent on the specific problem at hand. Features are usually numerical (3.14), Boolean (yes, no), ordinal (never, sometimes, always), or categorical (A, B, O).

HDBD, with all its measured or streamed features and available sources of information (e.g. databases), may be classified as heterogeneous HDBD or simply as "heterogeneous data". The terms "heterogeneous" means that the data includes MDDPs assembled from numbers and characters having different meanings, different scales and possibly different origins or sources. Heterogeneous data may change constantly with time, in which case it is referred to as "heterogeneous dynamic" data.

In known art, HDBD is incomprehensible to understand, to draw conclusions from, or to find in it anomalies that deviate from a "normal" behavior. In this description, the terms "anomaly", "abnormality", "malfunction", "operational malfunction", "outlier", "deviation", "peculiarity" and "intrusion" may be used interchangeably. "Anomaly detection" refers to a process that identifies in a given dataset patterns that do not conform to established or expected normal behavior. The detected anomaly patterns often translate into critical and actionable information in many different application domains, such as cyber protection, operational malfunctions, performance monitoring, financial transactions, industrial data, healthcare, aviation, monitoring or process control. It is therefore clear that anomaly detection has huge practical commercial, security and safety implications, to name a few.

Known machine-learning-based anomaly detection methods include usually two sequential steps: training and detection. The training step identifies the normal behavior in training data, defines a distance (affinity or metric) and provides some normal characteristic (profile) of the training data. The affinity may be used to compute deviation of a newly arrived MDDP ("NAMDDP") from the normal data profile. The detection step computes the affinities for the NAMDDP and classifies the NAMDDP as either normal or abnormal.

Anomaly detection in HDBD is critical and in extensive use in a wide variety of areas. For example, anomaly detection is used to identify malicious activities and operational malfunction in network intrusions or financial fraud, customer behavioral change and manufacturing flaws in energy facilities. In financial activities, anomaly detection is used to detect fraud, money laundering and risk management in financial transactions, and to identify abnormal user activities. Anomaly detection in these areas may also be used to detect suspicious terrorist activities.

Another area is customer behavioral analysis and measurement, practiced for example in marketing, social media and e-commerce. In these areas, attempts are made to predict behavior intention based on past customer attitude and social norms. These predictions, in turn, will drive eventually targeted advertisements and online sales. Anomaly detection in this field would relate to monitoring of changes in consumers behavior, which may avoid substantial market losses.

Yet another area involves critical infrastructure systems or process control. In this area, many sensors collect or sense continuously several measurements in a predetermined time unit. When these sensors are connected through a communication network, the area is related to "Industrial Internet" and "Internet of Things". Fusion of these measurements leads to the construction of a HDBD dataset. Here, anomaly detection may be used exemplarily for fault detection in critical infrastructure or for inspection and monitoring, and enables to perform predictive analytics. While monitoring critical infrastructure resources, anomalies originated from cyber threats, operational malfunction or both can be detected simultaneously.

In an illustrative example of anomaly detection use, an entity such as a network, device, appliance, service, system, subsystem, apparatus, equipment, resource, behavioral profile, inspection machine, performance or the like is monitored. Assume further that major activities in incoming streamed HDBD obtained through the monitoring are recorded, i.e. a long series of numbers and/or characters are recorded and associated with time stamps respective of a time of recordation. The numbers or characters represent different features that characterize activities in or of the entity. Often, such HDBD has to be analyzed to find specific trends (abnormalities) that deviate from "normal" behavior. An intrusion detection system ("IDS"), also referred to as anomaly detection system or "ADS", is a typical example of a system that performs such analysis. Malfunction is another typical example of an abnormality in a system.

Similar problems in identifying abnormalities in data are encountered in many network unrelated applications. One example relates to the control or monitoring of a process that requires detection of any unusual occurrences in real-time. Another example is the real-time (online) detection of operational malfunctions in SCADA protocols. Analysis of SCADA protocols can discover either malware insertion or operational malfunction or both.

Many of the current methods used to extract useful intelligence from HDBD require extensive computational resources, are time consuming, and, when used for anomaly detection, fail to detect anomalies before they become operational. Therefore, there is a need for, and it would be advantageous to have anomaly detection methods and systems that require less computational effort and are faster. There is also a need for anomaly detection methods and systems that can detect unknown anomalies representing unknown attacks or malfunctions. In other words, there is a need for methods and systems that perform automatic or "un-supervised" anomaly detection, defined as detection that does not require rules, signatures, patterns, domain expertise or semantics understanding of the input data. In addition, the number of false alarms should be as low as possible.

SUMMARY

In this description, an "undesirable event" indicated by an anomaly or by an "abnormal MDDP" may for example be any of (but not limited to): a cyber-threat, a cyber-attack, an operational malfunction, an operational breakdown, a process malfunction, a process breakdown, a financial risk event, a financial threat event, a financial fraud event or a financial network intrusion event.

In exemplary embodiments, there is/are provided a method or methods for detection of anomalies in HDBD indicative of undesirable events that are unknown before the application of the method or methods (referred to as "unknown undesirable events"), and systems for implementing such methods.

In an exemplary embodiment, there is disclosed as method for detecting an undesirable event, comprising the steps of receiving a dataset comprising a plurality n of MDDPs, embedding the MDDPs in an lower dimension embedded space to obtain embedded MDDPs, calculating distributions of distances $D_{nn}^i$, i=1, ..., n of each embedded MDDP from a plurality of nearest-neighbors (nn) to compute a threshold $D_{nn}^t$; and classifying a particular MDDP of the dataset or a newly arrived MDDP (NAMDDP) as an abnormal MDDP based on comparison with threshold $D_{nn}^t$, wherein the classification is automatic and unsupervised without relying on a signature, rules or domain expertise and wherein the particular MDDP classified as abnormal is indicative of the unknown undesirable event.

In an exemplary embodiment there is provided a system for detecting an unknown undesirable event, comprising an input device configured to receive a dataset comprising a plurality n of MDDPs, a processor configured to embed the MDDPs in an lower dimension embedded space to obtain embedded MDDPs, and a detection engine configured to calculate distributions of distances $D_{nn}^i$, i=1, ..., n of each embedded MDDP from a plurality of nearest-neighbors (nn) to compute a threshold $D_{nn}^t$ and to classify a particular MDDP of the dataset or a newly arrived MDDP (NAMDDP) as an abnormal MDDP based on comparison with threshold $D_{nn}^t$, wherein the classification is automatic and unsupervised without relying on a signature, rules or domain expertise and wherein the particular MDDP classified as abnormal is indicative of the unknown undesirable event.

Exemplarily, the HDBD may be processed using $I \subset R^m$ as a training dataset, where m denotes the dimensions respective of the data point features, and where I represents the set of training data. Exemplarily, m≥2. The training data can contain anomalies. Whitening Principal component analysis (PCA) may be applied as a preprocessing step to training data subset I, to reduce the training data's dimensionality and to de-correlate the data. (PCA is a statistical procedure that uses an orthogonal transformation to convert a set of observations of possibly correlated variables into a set of values of linearly uncorrelated variables called principal components. This is used among others to reduce the dimension of the data. A whitening transformation by PCA (WPCA) is a decorrelation transformation that transforms an arbitrary set of variables having a known covariance matrix into a set of new variables whose covariance is the identity matrix (meaning that they are uncorrelated and all have variance 1). Whitening makes the input less redundant. It is called "whitening" because it changes the input vector into a white noise vector.

Features may include:

1. In communication networking data: features from TCP protocol:

Number of TCP/IP packets; number of UDP/IP packets; number of ICMP packets; number of packets which are not TCP, UDP or ICMP; number of TCP packets with TCP flag "syn" ON; number of TCP packets with TCP flag "ack" ON; number of TCP packets with TCP flag "cwr" ON; number of TCP packets with TCP flag "ecn" ON; number of TCP packets with TCP flag "fin" ON; number of TCP packets with TCP flag "ns" ON; number of TCP packets with TCP flag "push" ON; number of TCP packets with TCP flag "res" ON; number of TCP packets with TCP flag "reset" ON; number of TCP packets with TCP flag "urg" ON; number of TCP packets with destination port 80 (HTTP); number of UDP packets with destination port 53 (DNS); number of TCP packets with source port 0; number of data TCP packets which where retransmitted (indication of slow application performance and packet loss); number of control TCP packets (packets without a payload); number of data TCP packets (packets with a payload); number of data TCP bytes (the bytes count of all the payloads); number of TCP connections (sessions); number of completed TCP connections; ratio between the number of TCP packets with reset flag ON and the number of TCP packets with syn flag ON (computed feature); ratio between the number of TCP packets with syn-ack flags and/or the number of TCP packets with syn flag (computed feature).

2. In process control data: features from a laser machine: Base Plate Temp; BBO temp; Current Crystal; Error Signal Gain; Error Signal Max; Error Signal Min; Error Signal Offset; Etalon Temp; Laser Diode Drv. Curr.; Hor. Pos. 2nd Quadr. Ph.-D.; LBO Temp; PD1; PD2; Power Alarm Threshold; and/or Power From Diodel.

3. In financial data: transaction logs; account balance snapshots; customer profiles; applicant information such as income, age, account balance; collateral information such as postal code, property value, property type; application information such as loan type and/or interest, conditions. In general, each feature can be a measurement (e.g. balance, amount etc.), an identifier (e.g. account number, user id etc.) or a code (status/error code etc.). Fraudulent features may include: scheme, journal entry, journal description, manual insertion, posted date, effective date, period, debit, credit, row ID, account and/or account description.

In exemplary method embodiments, the step of embedding the MDDPs in a lower dimension embedded space to obtain embedded MDDPs includes normalizing the MDDPs to obtain distributions of normalized MDDPs (NMDDPs) and applying whitening principal component analysis (WPCA) to obtain a lower dimension embedded space with embedded normalized NMDDPs. The applying of WPCA may exemplarily include applying singular value decompositions (SVD) of a covariance matrix to compute an embedding matrix and using the embedding matrix to obtain the embedded space. The calculation of the distributions of distances $D_{nn}^i$, i=1, . . . , n of each embedded NMDDP from a plurality of nearest-neighbors (nn) to compute a threshold $D_{nn}^t$ may exemplarily include applying a Gaussian mixture to each distribution to obtain Gaussian weights and using the Gaussian weights to compute threshold $D_{nn}^t$. The applying of a Gaussian mixture to each distribution to obtain Gaussian weights and the use of the Gaussian weights to compute threshold $D_{nn}^t$ may exemplarily include calculating the threshold from a posterior probability for each element in $D_{nn}^i$.

In exemplary embodiments, the undesirable event may one of be a cyber-threat, a cyber-attack, an operational malfunction, an operational breakdown, a process malfunction, a process breakdown, a financial risk event, a financial threat event, a financial fraud event or a financial network intrusion event.

An anomaly detection method and associated system disclosed herein may be characterized by not having or using domain expertise, signatures, rules, patterns or semantics understanding of all the available features. That is, the classification of an MDDP as abnormal is automatic or un-supervised, in that it does not require rules, signatures, patterns, domain expertise or semantics understanding of the input data.

Throughout the rest of this disclosure, "online" is used among other things to mean a process that can efficiently process the arrival of new samples. To achieve online anomaly detection, some systems may use signatures and rules of intrusions, which are developed and assembled manually after a new anomaly is exposed and distributed. This approach may be problematic, because these systems detect only already-known intrusions ("yesterday's" attacks and anomalous malfunctions) but fail to detect new attacks ("zero-day" attacks). In addition, they do not cover a wide range of high quality, new, sophisticated emerging attacks that exploit many network vulnerabilities.

In both offline and online processing, anomalies are detected first in a training dataset having training data. "Training data" is data of a finite size, used as a source for learning the behavior and the properties of the data. In offline processing, newly arrived MDDPs can be added to the training data and the anomaly detection process is applied from start to the new enhanced training data (which includes now the added newly arrived MDDPs). In online processing, embodiments disclosed herein have access only to the training data. The rest of the data (commonly referred to as "testing data") is sensed/streamed/captured constantly in real-time, and classification of each newly arrived MDDP (NAMDDP) as being either normal or abnormal is done online. In offline processing, it is assumed that the training dataset and the testing dataset are the same.

Exemplary method embodiments disclosed herein do not use domain expertise, signatures, rules, patterns or semantics understanding of all the available features. Accordingly, an exemplary method disclosed herein detects the anomalous MDDP but does not provide the root cause of the occurrence of the anomaly, i.e. does not identify the cause of the undesirable event. In other words, the source of such an anomalous MDDP (the undesirable event) cannot be classified during the detection stage. It is the MDDP itself, rather than the source thereof, that is classified as an anomalous MDDP. The classification is performed without relying on a signature of a threat.

BRIEF DESCRIPTION OF THE DRAWINGS

The description is herein described, by way of example only, with reference to the accompanying drawings, wherein.

DETAILED DESCRIPTION

Figure 1:
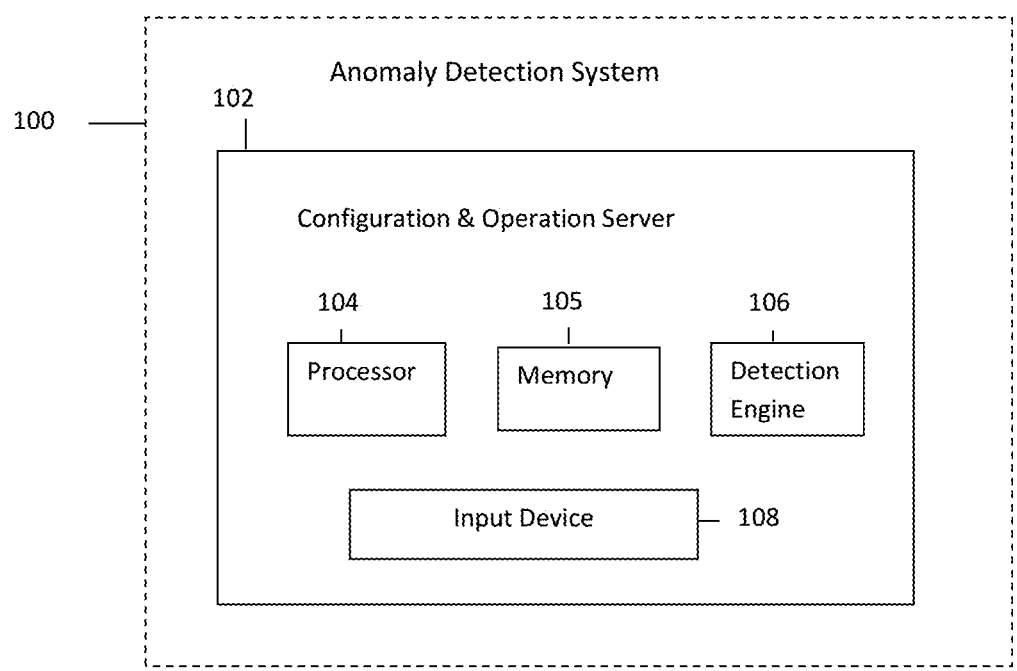
FIG. 1 shows schematically an exemplary embodiment of a system for detecting an anomaly in HDBD.

FIG. 1 shows schematically an exemplary embodiment of a system for detecting an anomaly in HDBD designated by alphanumeric reference "100". System 100 is dedicated to perform WPCA-based anomaly detection methods described below. System 100 comprises a configuration and operation server 102. Server 102 may comprise a processor 104, a memory 105 and an anomaly detection engine 106. Data processing engine 104 and detection engine 106 are configured to implement methods for detecting an anomaly in HDBD using WPCA as described below. Server 102 may further include an input device 108. In some embodiments, memory 105 may include instructions which, when executed by processor 104, may result in processes, methods and/or operations for detecting an anomaly in HDBD. Such processes, methods and/or operations may be implemented by detection engine 106. Server 102 is configurable and/or may be configured to perform "on-the-fly dynamic" actions, including addition and/or change and/or removal of data sources; modification of data types and formats; modification of interfaces; modification of operational modes; feature selection; feature enhancement by computation; sorting and data integrity validation; addition, omission and/or modification of measures computed on input data; dynamic change of data input mechanisms including, e.g., pull and push, over a variety of collection technologies; performing batch mode, live streaming or both; application of computational measures to the input data features and/or further addition, omission and modification of the measure—all done without changing the system software code and without even halting the system's operation. The various configurations and modifications may be done by request of the user transferred via an input device 108 which may include a keyboard and/or a touch screen. The mechanism of pull/push may be applied to input and to output data in the same way or differently.

As indicated above, the anomaly detection provided herein has two operational modes: offline and online. The offline mode (also referred to as training process) may be applied to a fixed dataset known in advance. The online mode processes newly-arrived MDDPs (NAMDDPs) that did not participate in the training process. Both processes are performed by system 100. In some embodiments, a training process may be applied to a dataset that comprises "old" NAMDDPs. "Old NAMDDP" refers to an NAMDDP that was fused with an existing MDDP (e.g., training data) stored in system 100. For example, such "old" NAMDDPs may be fused with NAMDDPs to obtain new training data. In some embodiments, a step that is performed in the offline mode may be executed in the online mode. However, merely to simplify the discussion that follows, without being to be construed as limiting, the terms "offline mode" and "online mode" are used herein for indicating the processing of a fixed dataset known in advance and for the processing of NAMDDPs, respectively. NAMDDPs are processed online based on the offline-processed dataset.

Accordingly, the offline and the online modes may be used to detect anomalies in fully known data and in NAMDDPs, respectively. The fully known data and NAMDDPs can come from different sources.

Figure 2:
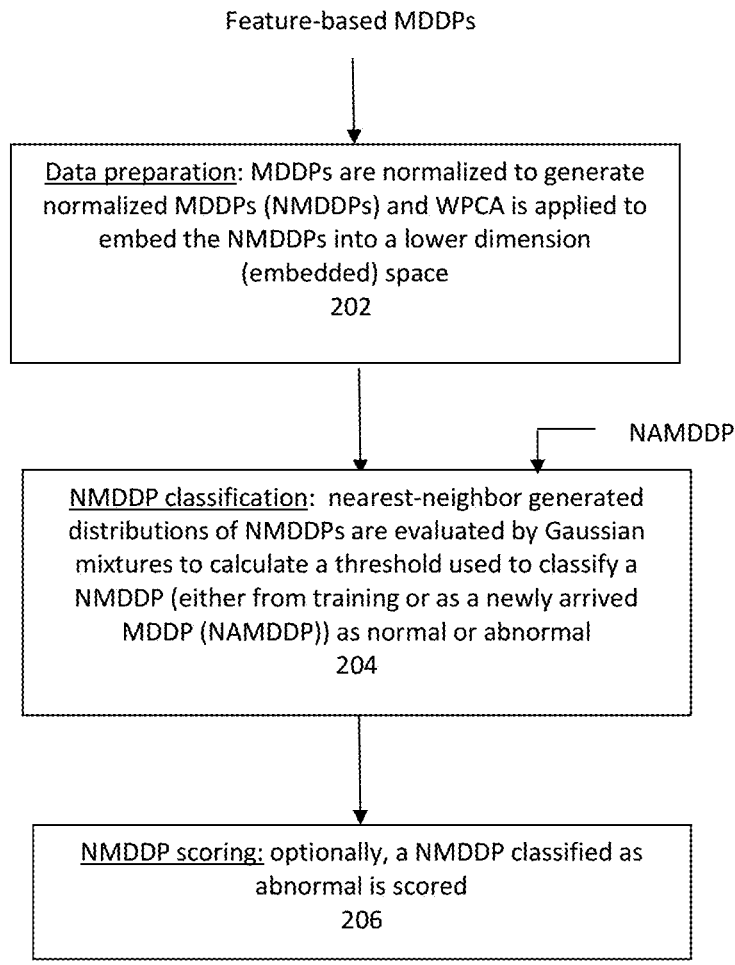
FIG. 2 shows schematically a general overview of an exemplary embodiment of a method for detecting an anomaly in HDBD.

Reference is made to FIG. 2 which shows schematically a general overview of the detection mode in an exemplary embodiment. MDDPs are received as input e.g., at memory 105 via input device 108. In an embodiment, the method may comprise, preparing the received MDDPs (step 202), classifying the prepared MDDPs (step 204) as normal or abnormal and, optionally, scoring an abnormal MDDP (step 206).

Step 202 of data preparation may include normalizing the received MDDPs to obtain normalized MDDPs. The NMDDPs may be used for determining a feature-based distribution thereof. Step 202 of data preparation may further and exemplarily include applying WPCA to the NMDDPPs to obtain NMDDPPs in a lower dimension embedded space.

Step 204 of classifying a received NAMDDP (or an already known NMDDP) as normal or abnormal may include estimating Gaussian mixture parameters of the NMDDPs embedded in the lower space by employing, for example, the expectation-maximization (EM) algorithm. Already-known NMDDPs may be processed offline and referred to as training data. NAMDDPs may be processed online.

The distributions of the NMDDPs in the embedded space are evaluated by Gaussian mixtures, with weights estimated by the application of the EM algorithm to the Gaussian mixtures. A threshold is then calculated as described below. A MDDP (though its respective NMDDP) is classified as either normal or abnormal based on the threshold. In step 206, a MDDP classified as abnormal may be associated with a computed score representative of the "magnitude of anomaly".

Figure 3:
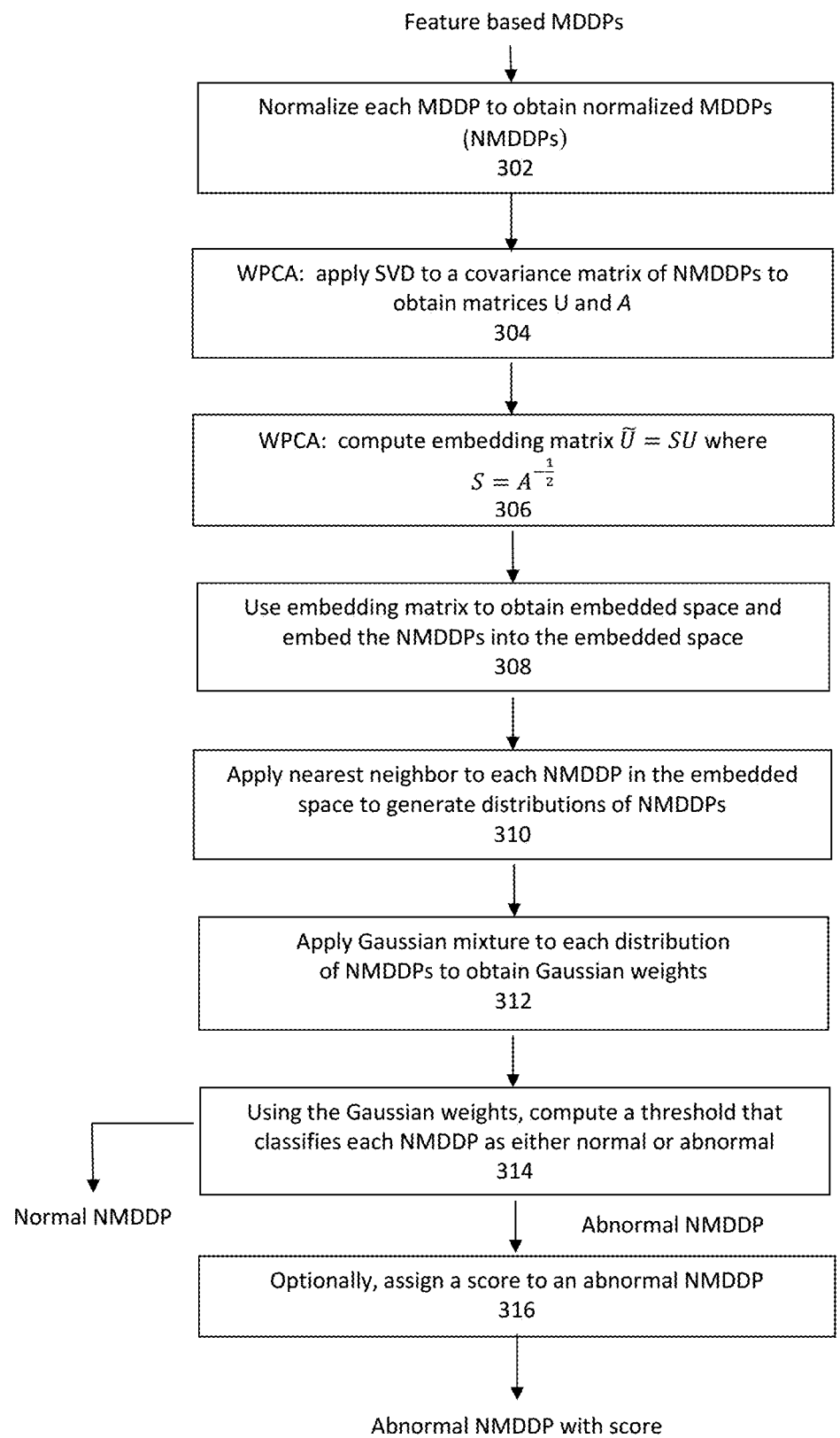
FIG. 3 shows schematically details of an exemplary embodiment of an anomaly detection method disclosed herein.

Reference is now made to FIG. 3, which shows schematically details of an exemplary embodiment of an anomaly detection method disclosed herein. From now on till mentioned differently, the following descriptions fit offline and online processing.

Raw data obtained from a variety of data sources (e.g. from network traffic, logs, equipment sensors, production data, historian) may have its integrity checked and may be fixed, parsed and/or arranged for example in a feature-based matrix, e.g., as known in the art. Assume that the parsed data of the source (raw) input data $I \subset R^m$. That is, the parsed data includes n measurements of MDDPs, where each MDDP has m features (parameters). The data I can be viewed as a matrix of size n×m, where n is the number of measurements (number of rows in the matrix I) and where each row is a MDDP (also referred to as "vector of m measurements"). m is also the number of columns in the matrix I. The matrix I is also called the training set. In online mode, a NAMDDP $x \in R^m$ and $x \notin I$, which does not belong to I, is classified as either normal (inlier) or anomalous (outlier) MDDP. In offline mode, outliers in I are classified as anomalous MDDPs in I.

The parsed data may optionally be adapted to different interfaces that fit different devices and different subsystems, to provide parsed data, e.g., as known in the art, for example, in the form of a feature-based matrix.

Training: The Following Pre-Processing Steps are Applied to I:

In step 300 feature-based data is received by system 100 as an input. The received data may be for example arranged suitable for MDDPs, e.g., in a feature-based matrix I. Arranging the received data may include removal of duplicate MDDPs entries in I.

In step 302, MDDP normalization is performed by detection engine 106. In an exemplary normalization procedure, each column feature in matrix I is normalized. The value of each feature column is distributed according a fixed number of bins or intervals in a range of values. This can done in the following way: The number of bins is $\lceil \sqrt{n} \rceil$. The bin index is i, i=1, . . . , n. Each element in the feature column is replaced by $$\frac{i}{\lceil \sqrt{n} \rceil - 1}, i = 1, \ldots, n.$$

In other words, the associated bin index i, i=1, . . . , n is divided by the number of bins minus one.

Steps 304 and 306 below describe the WPCA.

In step 304, singular value decomposition (SVD) is applied to the covariance matrix $I^T I$ where T is the transpose of a matrix, where the output of the SVD is $svd(I^T I) = UAU^T$ and where U is the matrix that holds all the eigenvectors as columns of $svd(I^T I)$. The data is stored in storage 108. The matrix U is of size k×m where k is the rank of I. The first k eigenvalues are the largest eigenvalues. A is the diagonal matrix of the eigenvalues of covariance matrix $I^T I$. There are several ways to compute the rank of covariance matrix $I^T I$. For example, the rank can be computed by the number of eigenvalues divided by the largest eigenvalue whose division values are higher than 0.001.

In step 306, embedding matrix $\tilde{U} = SU$, where $$S = A^{-\frac{1}{2}},$$

is computed.

In step 308, the NMDDPs are embedded by the k eigenvalues and the k eigenvectors computed from the covariance matrix $I^T I$ in step 304. The embedding is done by projecting I on the embedding matrix $\tilde{U}$ by using the matrix multiplication $\tilde{U}I$. $\tilde{U}I$ is the embedded space.

Once the NMDDPs are embedded in the embedded space with dimension k, a nearest neighbor method is applied to MDDPs in the embedded space in step 310 to generate a distribution of MDDPs. The sum of the Euclidian distances of each MDDP i=1, ..., n, to its $M_{nn}$ (e.g. 50) nearest neighbors is computed and denoted by $D_{nn}^i$, i=1, ... n. Note that the number 50 for $M_{nn}$ is exemplary and non-limiting. For example, $M_{nn}$ may vary between 10-100.

In step 312, a Gaussian mixture approximation (exemplarily 1 to 4 Gaussians) is applied to the distributions of the distances $D_{nn}^i$ i=1, ..., n, using, for example, the expectation-maximization (EM) algorithm (A. Dempster, N. Laird and D. Rubin, "Maximum Likelihood from Incomplete Data via the EM Algorithm", Journal of the Royal Statistical Society 39(1) (1977) p 1-38). Namely, the Gaussian mixture, which is applied to $D_{nn}^i$, i=1, ..., n, is represented by $P(D_{nn}^i) = \sum_{j=1}^M w_j G(x|\mu_j, \sigma_j)$, i=1, ..., n, M=1, ..., 4, where $w_j$ are the Gaussian weights, $G(x|\mu_j, \sigma_j)$ are the Gaussians densities, $\mu_j$ is the Gaussian mean of Gaussian j=1, ..., 4 and $\sigma_j$ is the standard deviation of Gaussian j. The EM algorithm is an iterative algorithm that maximizes the likelihood of the Gaussian mixture. In each iteration, the parameters $\mu_j$ and $\sigma_j$ of the Gaussian mixture are calculated until EM converges to the Gaussian mixture parameters. The EM algorithm can be applied to a variable number of Gaussians. In an embodiment, the number of Gaussians, for which the Akaike information criterion (AIC) is the lowest, is kept. AIC may be defined by AIC=2k−2 ln(L), where k is the number of parameters in the model and L is the maximum likelihood derived from the EM algorithm.

In step 314, a threshold $D_{nn}^t$ used to separate between normal and abnormal MDDPs is calculated from the posterior probability for each element in $D_{nn}^i$ defined by $$P(i|x, \mu_i, \sigma_i) = \frac{w_i G(x|\mu_i, \sigma_i)}{\sum_{k=1}^M w_k G(x|\mu_k, \sigma_k)}.$$

By means of the posterior probability, each element in $D_{nn}^i$ is assigned an association probability to each of the found Gaussians. Through the construction above, an abnormal MDDPs has an average distance $D_{nn}^i$ that is larger than that of normal MDDPs. Therefore, the association probability $P(j|x, \mu_j, \sigma_j, \max_j(\mu_j + \sigma_j))$ of the largest $D_{nn}^i$ (of the abnormal MDDPs) relative to the Gaussian j for which $\mu_j + \sigma_j$ is the largest is close to 1. Relative to Gaussian j, the normal MDDPs have association probabilities much lower than 1. In an exemplary embodiment, threshold $D_{nn}^t$ is computed to be the distance for which $P(j|x, \mu_j, j, \max_j(\mu_j+\sigma_j)) \approx 0.9$. In other words, when a MDDP's associated probability is less than about 0.9, then the MDDP is classified as normal. Otherwise it is classified as abnormal. Clearly, $D_{nn}^t$ can be computed to be the distance for which $P(j|x, \mu_j, j, \max_j(\mu_j+\sigma_j))$ may receive other values. For example, $P(j|x, u_j, j, \max_j(\mu_j+\sigma_j))$ may receive values of ≈0.85, ≈0.8, ≈0.75, ≈0.7, ≈0.65 or ≈0.6.

The classification (step 314) and the score assignments (step 316) in the offline and online modes may for example be done in the following ways:

In Offline mode, anomaly detection and computation of anomaly scoring may be executed exemplarily as follows:

All MDDPs in I with $D_{nn}^i$, i=1, ..., n, such that $D_{nn}^i > D_{nn}^t$ are classified as anomalies. Each anomaly score may for example be assigned a score ranging from 0-100 according to $D_{nn}^i$.

$$\sigma_s = \frac{std(D_{nn}^j)}{0.3628}$$

then $$S_f = \frac{1}{1 + e^{-\frac{D_{nn}^i - D_{nn}^t}{\sigma_s}}}$$

(sigmoid) are computed, and the final score is $$S = -100\frac{S_f - \frac{1}{2}}{1 - \frac{1}{2}}.$$

In Online mode, anomaly detection and the respective computation of anomaly scoring may be performed exemplarily as follows:

A newly arrived MDDP (NAMDDP) $x \in R^n$, which did not participate in the learning or training phase, is normalized by assigning it to a bin in the same way as was done for the training data in step 302. Next, x is projected onto the WPCA subspace found from the training part as was done in step 308. This is done by forming U from the k vectors that define by the PCA. Then, Ũx, which is the MDDP x in the embedded space, is generated. The average distance between each NAMDDP and its $M_{nn}$ nearest neighbors in the embedded space is computed and denoted by $D_{nn}^x$. A NAMDDP is classified as an anomalous MDDP if its $D_{nn}^x$ is larger than $D_{nn}^t$.

As in the offline mode, each anomaly scoring may be scored with a score from 0-100 according to:

$$D_{nn}^x \cdot \sigma_s = \frac{std(D_{nn}^x)}{0.3628}$$

then $$S_f = \frac{1}{1 + e^{-\frac{D_{nn}^x - D_{nn}^t}{\sigma_s}}}$$

are computed. Correspondingly, the final score may be expressed as $$S = -100\frac{S_f - \frac{1}{2}}{1 - \frac{1}{2}}.$$

Experimental Results on Networking Data

One example for online detection may be found in the DARPA raw networking data (DARPAN) dataset, M. Mahoney and P. Chan, "An analysis of the 1999 DARPA/Lincoln Laboratory evaluation data for network anomaly detection", Proceeding of Recent Advances in Intrusion Detection (RAID)-2003, volume 2820, pages 220-237. In DARPAN, original features were extracted from a packet oriented communication and additional features were computed from the extracted features and added to the list of original features. The extracted features from DARPAN dataset go through addition and enhancement resulting in computed features. Comprehensive evaluations of the performance of the online method for intrusion detection were performed by applying the online algorithm to DARPA datasets from DARPAN. These evaluations included building an intrusion detection system to find attacks against UNIX and Windows NT systems and against Cisco Routers. The network architecture and the background traffic were designed to simulate traffic that is similar to Air Force base traffic.

Figure 4A:
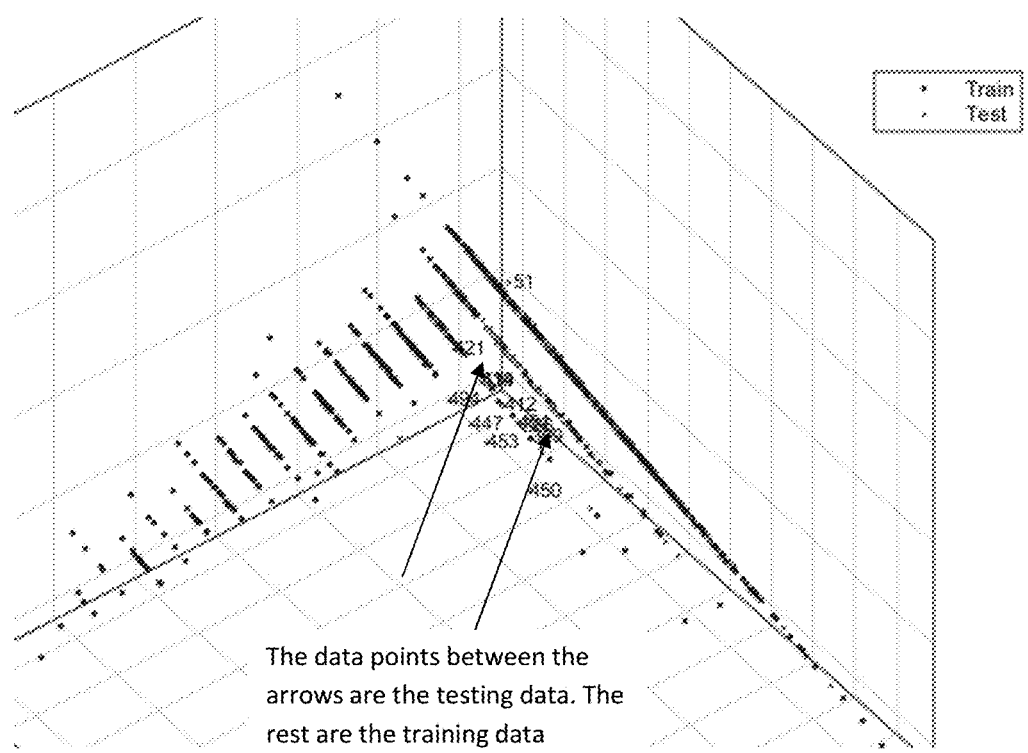
FIG. 4A shows graphically experimental results of online anomaly detection performed with a method and system disclosed herein on DARPAN networking data; with the training data shown after the completion of step 314 below.
Figure 4B:
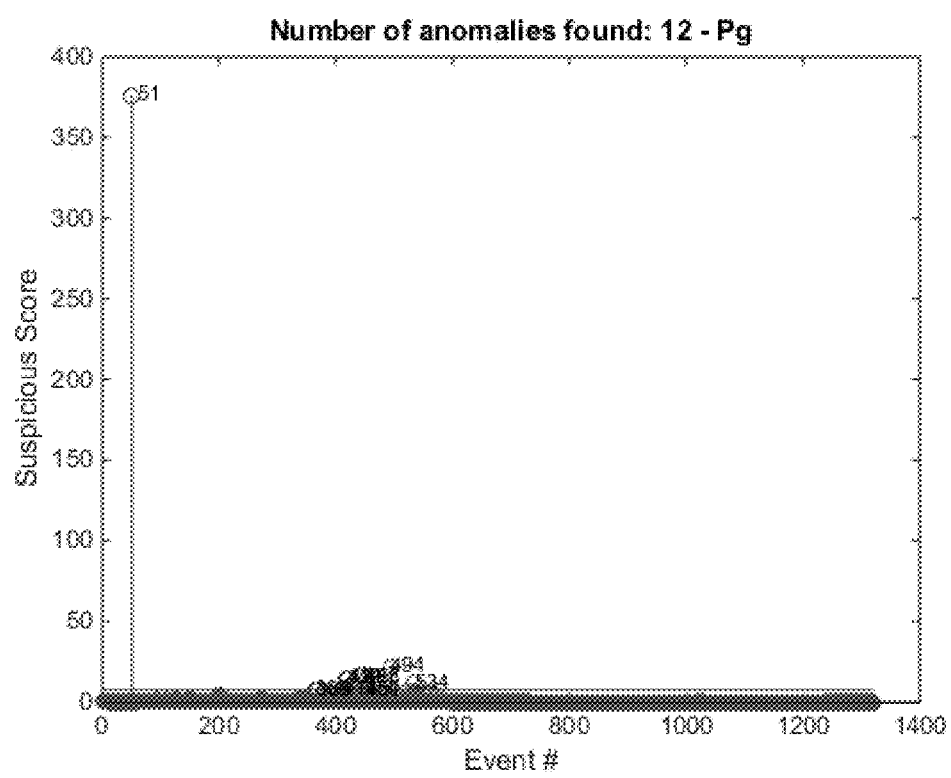
FIG. 4B shows an anomalous data point (indicative of an unknown undesirable event) at time 51.

The training was on days that did not include attacks (representing unknown undesirable events). The testing of the online method was performed on two weeks of data. A NAMDDPP in each time slice was handled in real-time by the application of the online algorithm. The results are presented at the end one day (Monday), after handling 1320 MDDPs in real-time (one MDDP at a time). FIG. 4A shows the training data after the completion of step 314. FIG. 4B shows an anomalous data point (indicative of an unknown undesirable event) at time 51, which is correct according to the labels of the DARPA data, its computed scores and the comparison to the other data points from the testing data. The training set, processed offline, does not have any anomalies, as reported in DARPAN.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The terms "non-transitory computer-readable storage device" and "non-transitory machine-readable storage device" encompasses distribution media, intermediate storage media, execution memory of a computer, and any other medium or device capable of storing for later reading by a computer a computer program implementing embodiments of a method disclosed herein. A computer program product can be deployed to be executed on one computer or on multiple computers at one site or distributed across multiple sites and interconnected by a communication network.

All references mentioned in this specification are herein incorporated in their entirety by reference into the specification, to the same extent as if each individual patent was specifically and individually indicated to be incorporated herein by reference. In addition, citation or identification of any reference in this application shall not be construed as an admission that such reference is available as prior art to the present application.

What is claimed is:

1. A method for detecting an unknown undesirable event, comprising: in a computer system:
   a) receiving a dataset comprising a plurality n of multi-dimensional datapoints (MDDPs) with a dimension m≥2 and wherein n>>m;
   b) applying whitening principal component analysis (WPCA) to obtain a lower dimension embedded space with a dimension smaller than m;
   c) embedding the MDDPs into the lower dimension embedded space to obtain embedded MDDPs;
   d) calculating distributions of distances $D^i_{nn}$, i=1 . . . n of each embedded MDDP from a plurality of nearest-neighbors (nn) to compute a threshold $D^t_{nn}$;
   e) classifying a particular MDDP of the dataset or a newly arrived MDDP (NAMDDP) as an abnormal MDDP if a respective distance $D^i_{nn}$ of the particular MDDP or NAMDDP is larger than threshold $D^t_{nn}$, wherein the particular MDDP or NAMDDP classified as abnormal is indicative of the unknown undesirable event; and
   f) computing a score that indicates the magnitude of the abnormality, whereby the whitening and the embedding in a lower dimension space reduce computer memory needs and speed up computing operations.

2. The method of claim 1, wherein the calculating distributions of distances $D^i_{nn}$, i=1, . . . , n of each embedded NMDDP from a plurality of nearest-neighbors (nn) to compute a threshold $D^t_{nn}$ includes applying a Gaussian mixture to each distribution to obtain Gaussian weights and using the Gaussian weights to compute threshold $D^t_{nn}$.

3. The method of claim 2, wherein the applying a Gaussian mixture to each distribution to obtain Gaussian weights and using the Gaussian weights to compute threshold $D^t_{nn}$ includes computing threshold $D^t_{nn}$ from a posterior probability for each element in $D^i_{nn}$.

4. The method of claim 2, further comprising computing a score that indicates the magnitude of the abnormality.

5. The method of claim 1, wherein the classifying includes classifying the particular MDDP of the dataset or the NAMDDP as an abnormal MDDP offline.

6. The method of claim 1, wherein the classifying includes classifying the particular MDDP of the dataset or the NAMDDP as an abnormal MDDP online.

7. The method of claim 1, wherein the unknown undesirable event is selected from the group consisting of a cyber-threat, a cyber-attack, an operational malfunction, an operational breakdown, a process malfunction, a process breakdown, a financial risk event, a financial threat event, a financial fraud event, money laundering and a financial network intrusion event.

8. A computer program product, comprising: a non-transitory tangible storage medium readable by a processing circuit and storing instructions for execution by the processing circuit for performing a method comprising:

a) receiving a dataset comprising a plurality n of multi-dimensional datapoints (MDDPs) with a dimension m≥2 and wherein n>>m;

b) applying whitening principal component analysis (WPCA) to obtain a lower dimension embedded space with a dimension smaller than m;

c) embedding the MDDPs into the lower dimension embedded space to obtain embedded MDDPs;

d) calculating distributions of distances $D^i_{nn}$, i=1, ..., n of each embedded MDDP from a plurality of nearest-neighbors (nn) to compute a threshold $D^t_{nn}$; and e) classifying a particular MDDP of the dataset or a newly arrived MDDP (NAMDDP) as an abnormal MDDP if a respective distance $D^i_{nn}$ of the particular MDDP or NAMDDP is larger than threshold $D^t_{nn}$, wherein the particular MDDP or NAMDDP classified as abnormal is indicative of the unknown undesirable event, whereby the whitening and the embedding in a lower dimension space reduce computer memory needs and speed up computing operations.

9. The computer program product of claim 8, wherein the calculating distributions of distances $D^i_{nn}$, i=1, ..., n of each embedded NMDDP from a plurality of nearest-neighbors (nn) to compute a threshold $D^t_{nn}$ includes applying a Gaussian mixture to each distribution to obtain Gaussian weights and using the Gaussian weights to compute threshold $D^t_{nn}$.

10. The computer program product of claim 9, wherein the applying a Gaussian mixture to each distribution to obtain Gaussian weights and using the Gaussian weights to compute threshold $D^t_{nn}$ includes computing threshold $D^t_{nn}$ from a posterior probability for each element in $D^i_{nn}$.

11. The computer program product of claim 8, wherein the method further comprises computing a score that indicates the magnitude of the abnormality.

12. The computer program product of claim 8, wherein the classifying includes classifying the particular MDDP of the dataset or the NAMDDP as an abnormal MDDP offline.

13. The computer program product of claim 8, wherein the classifying includes classifying the particular MDDP of the dataset or the NAMDDP as an abnormal MDDP online.

14. A computer system, comprising: a hardware processor configurable to perform a method comprising steps of:

a) receiving a dataset comprising a plurality n of multi-dimensional data points (MDDPs) with a dimension m≥2 and wherein n>>m;

b) applying whitening principal component analysis (WPCA) to obtain a lower dimension embedded space with a dimension smaller than m;

c) embedding the MDDPs into the lower dimension embedded space to obtain embedded MDDPs;

d) calculating distributions of distances $D^j_{nn}$, i=1, ..., n of each embedded MDDP from a plurality of nearest-neighbors (nn) to compute a threshold $D^t_{nn}$; and e) classifying a particular MDDP of the dataset or a newly arrived MDDP (NAMDDP) as an abnormal MDDP if a respective distance $D^i_{nn}$ of the particular MDDP or NAMDDP is larger than threshold wherein the particular MDDP or NAMDDP classified as abnormal is indicative of the unknown undesirable event, whereby the whitening and the embedding in a lower dimension space reduce computer memory needs and speed up computing operations.

15. The computer system of claim 14, wherein the calculating distributions of distances $D^i_{nn}$, i=1 ... n of each embedded NMDDP from a plurality of nearest-neighbors (nn) to compute a threshold $D^t_{nn}$ includes applying a Gaussian mixture to each distribution to obtain Gaussian weights and using the Gaussian weights to compute threshold $D^t_{nn}$.

16. The computer system of claim 15, wherein the applying a Gaussian mixture to each distribution to obtain Gaussian weights and using the Gaussian weights to compute threshold includes computing threshold $D^t_{nn}$ from a posterior probability for each element in $D^i_{nn}$.

17. The computer system of claim 14, wherein the method further comprises computing a score that indicates the magnitude of the abnormality.

18. The computer system of claim 14, wherein the classifying includes classifying the particular MDDP of the dataset or the NAMDDP as an abnormal MDDP offline.

19. The computer system of claim 14, wherein the classifying includes classifying the particular MDDP of the dataset or the NAMDDP as an abnormal MDDP online.

\* \* \* \* \*